March 13, 1928.
A. F. FRASCA ET AL
1,662,497
BRAKE
Filed Dec. 29, 1926 2 Sheets-Sheet 1
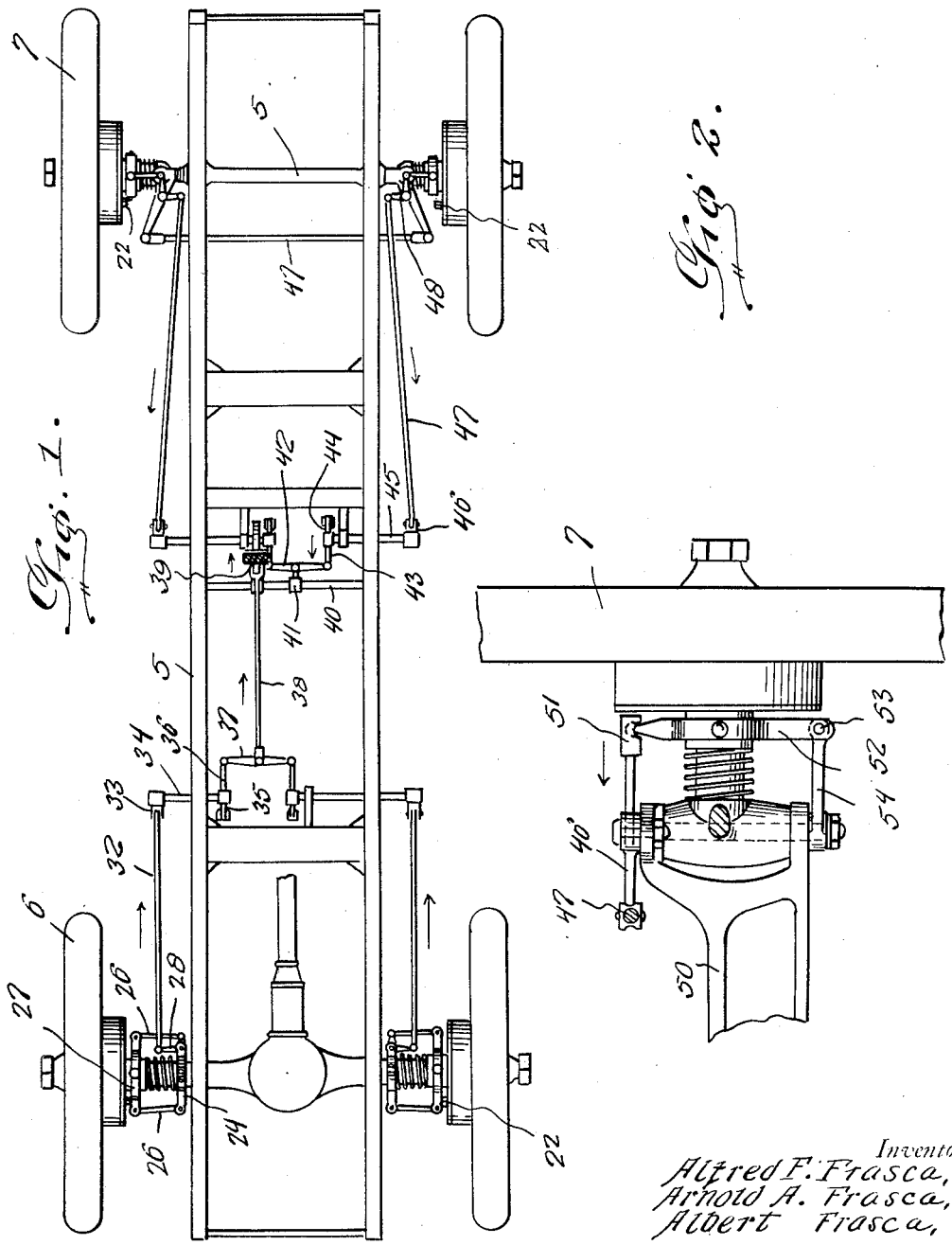
Inventors
Alfred F. Frasca,
Arnold A. Frasca,
Albert Frasca,
By Clarence A. O'Brien
Attorney March 13, 1928.  1,662,497
A. F. FRASCA ET AL
BRAKE
Filed Dec. 29, 1926  2 Sheets-Sheet 2
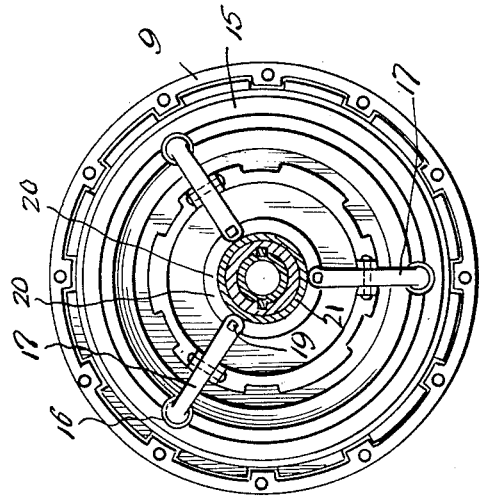
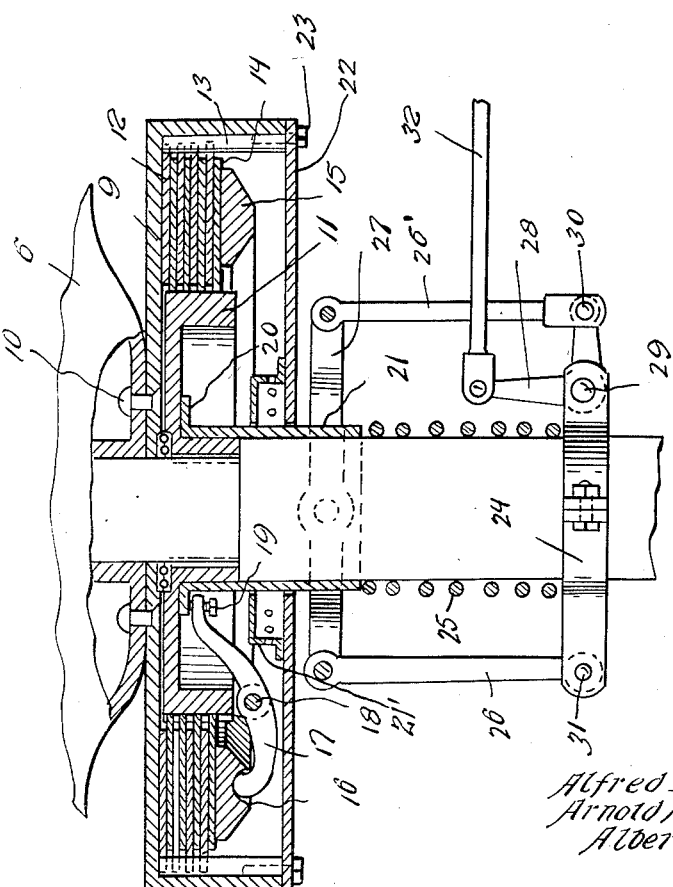
Inventors
Alfred F Frasca,
Arnold A Frasca,
Albert Frasca,
By Clarence A O'Brien
Attorney Patented Mar. 13, 1928.

1,662,497

UNITED STATES PATENT OFFICE.

ALFRED F. FRASCA, ALBERT FRASCA, AND ARNOLD A. FRASCA, OF SANDY RIDGE, PENNSYLVANIA.

BRAKE.

Application filed December 29, 1926. Serial No. 157,727.

The present invention relates to vehicle brakes, particularly of the four wheel type such as are used on automobiles.

The principal object of the invention resides in the elimination of the use of brake linings.

An important object of the invention lies in the provision of a brake structure which utilizes the principle of a disk clutch and has all the advantages thereof.

Another very important object of the invention lies in the provision of a brake structure which will prove thoroughly efficient in operation and use, thoroughly reliable, yet simple in its construction, strong, durable, compact and convenient, and otherwise well adapted to the purpose for which it is designed.

With the above and numerous other objects in view as will appear as the description proceeds, the invention resides in the novel features of construction, and in the combination and arrangement of parts as will be hereinafter more fully described and claimed.

In the drawings:

Figure 1 is a top plan view of an automobile chassis showing the brakes on all four wheels, Fig. 2 is a detail of one of the front wheel brakes, Fig. 3 is a sectional view of one of the rear wheel brakes, Fig. 4 is a sectional view of one of the brakes showing the cover removed from the drum.

Referring to the drawings in detail it will be seen that the numeral 5 denotes an automobile chassis mounted on rear wheels 6 and front dirigible wheels 7. Our improved brake structures are associated with the wheels 6 and 7. Each brake per se is the same, the difference between the front wheel brakes and the rear wheel brakes being in the operating mechanism only. We shall, therefore, first describe one of the brakes per se in detail from which you will understand all the brakes because of their identity of construction. The numeral 9 denotes a drum fixed to the wheel 6 as at 10 and rotatable therewith. The numeral 11 denotes a stationary drum fixed in any suitable manner against rotation such as being formed as an integral part of the axle housing or in any other preferred or suitable manner. A plurality of disks 12 are fixed to the interior of the drum 9 as at 13 while a plurality of disks 14 are fixed to the exterior of the drum 11. The disks 12 and 14 are alternately disposed. A pressure annulus 15 is adapted to engage one of the disks 14 and to be actuated to cause these disks to come into frictional engagement with each other for retarding the rotation of the drum and the wheels attached thereto. This pressure annulus 15 is provided with recesses 16. Levers 17 are pivoted as at 18 on the drums 11 and have ends engaged in the recesses 16. The other ends are provided with adjusting screws 19 engaging a flange 20 on an operating sleeve 21, in Fig. 3 shown as slidable on the axle housing and in Fig. 2 as slidable on the spindle. A cover plate 22 is held in place on the drum 9 to close the same by bolts 23 or in any other suitable manner. This cover plate is provided with an oil plug a distance from the edge of the drum so that oil may be put in the drum up to the level of the plug. An apertured dust guard 21' is suitably fixed to the cover plate 22 and extends about the sleeve 21 within the drum 9.

The operating mechanism for the rear brake is shown to advantage in Figure 3. Referring to one of these mechanisms it will be seen that the numeral 24 denotes the clamp engaged about the rear axle housing. A spring 25 impinges against the clamp and against the outer end of the slidable sleeve 21 holding it normally in an inactive position. Links 26 and 26' are pivotally engaged with the ends of arms 27 which are disposed to engage the sleeve 21. A bell crank lever 28 is pivoted as at 29 on the end of the clamp 24 and has one end pivotally engaged with the link 26' as at 30. The link 26 is engaged with the other end of the clamp structure as at 31. Rods 32 lead forwardly from the other end of the bell crank 28 and are engaged with cranks 33 on shaft 34 journaled in any suitable manner in the chassis 5 and operated by cranks 35 on their inner end. These cranks 35 are operated by links 36 pulled by pivoted cross member 37 on the end of a rod 38 which is actuated by the foot pedal 39 or in any other suitable manner. This foot pedal rotates the shaft 40 actuating a crank connection 41 to a pivoted cross member 42 which through links 43 actuates cranks 44 on the shaft 45. Through cranks 46 the shaft 45 pulls upon rods 47 and the pedal is depressed for actuating bell cranks 48 which are pivoted on brackets 49 of the front axle 50. These bell cranks are engaged by ball and socket joint 51 with arms 52 pivoted at 53 on bracket member 54 at the bottom of the spindles. These arms 52, of course, actuate the sleeve 21. When all the sleeves 21 are pulled out it will be seen that the levers 17 are rocked so as to bring the disks 12 and 14 into frictional engagement thereby braking the wheel. It will be seen that the operating mechanism is equalized through the various connections described.

It is thought that the construction, utility, operation, and advantages of the invention will now be clearly understood by those skilled in this art without a more detailed description thereof. We have disclosed the present embodiment of the invention since in actual practice it attains the features of advantage enumerated as desirable in the statement of the invention and the above description. It will be quite apparent that the changes in details of construction, and in the combination and arrangement of parts may be resorted to without departing from the spirit and scope of the invention as hereinafter claimed or sacrificing any of its advantages.

Having thus described our invention what we claim as new is:—

A brake structure of the class described including a stationary drum, a rotatable drum disposed about the stationary drum, discs on both the drums in alternate arrangement, a pressure annulus, a plurality of levers pivotally mounted on the stationary drum and having their outer ends engaged with the annulus to force the annulus against the discs to cause them to frictionally engage with one another for braking the movable drum in relation to the stationary drum, a slidable sleeve having a flange engaging the other ends of the levers, a clamp, a link pivoted to one end of the clamp, arms pivoted to the link and engaged with the sleeve, a bell crank on the other end of clamp having one end engaged with a link engaged with the other end of the arm, means for rocking the bell crank, and spring means positioned between the slidable sleeve and the clamp.

In testimony whereof we affix our signatures.

ALFRED F. FRASCA.
ALBERT FRASCA.
ARNOLD A. FRASCA.